United States Patent
Meredith et al.

(10) Patent No.: US 11,160,001 B2
(45) Date of Patent: *Oct. 26, 2021

(54) CONTROL OF WIRELESS FIDELITY ACCESS FOR 5G OR OTHER NEXT GENERATION NETWORK

(71) Applicant: AT&T Intellectual Property I, L.P., Atlanta, GA (US)

(72) Inventors: Sheldon Meredith, Roswell, GA (US); Mark Austin, Allen, TX (US); Rick Tipton, Corryton, TN (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,423

(22) Filed: Jun. 2, 2020

(65) Prior Publication Data
US 2020/0305050 A1 Sep. 24, 2020

Related U.S. Application Data

(63) Continuation of application No. 15/854,099, filed on Dec. 26, 2017, now Pat. No. 10,708,835.

(51) Int. Cl.
*H04W 36/22* (2009.01)
*H04W 36/30* (2009.01)
(Continued)

(52) U.S. Cl.
CPC .......... *H04W 36/22* (2013.01); *H04W 28/08* (2013.01); *H04W 36/245* (2013.01);
(Continued)

(58) Field of Classification Search
CPC ... H04W 36/22; H04W 36/245; H04W 36/30; H04W 28/08; H04W 72/08; H04W 72/0493; H04W 48/20; G01S 19/04
See application file for complete search history.

(56) References Cited

U.S. PATENT DOCUMENTS

| 6,347,091 B1 | 2/2002 | Wallentin et al. |
| 2006/0072452 A1* | 4/2006 | Olariu ................ H04L 47/125 370/229 |

(Continued)

FOREIGN PATENT DOCUMENTS

| CN | 103945457 A | 7/2014 |
| CN | 104105137 A | 10/2014 |

(Continued)

OTHER PUBLICATIONS

Whittier et al., "Mobile data offloading addressing the service quality vs. resource utilisation dilemma", Personal, Indoor, and Mobile Radio Communications (PIMRC), 2016, IEEE 27th Annual International Symposium on, IEEE, 2016 7 pages.

(Continued)

*Primary Examiner* — Harry H Kim
(74) *Attorney, Agent, or Firm* — Amin, Turocy & Watson, LLP

(57) ABSTRACT

Techniques for facilitating cellular or wireless fidelity access point selection are provided. In one example herein a method is provided comprising receiving, by a mobile device comprising a processor, first radio load data associated with a predicted radio load of a first channel of a first wireless device. Based on a first condition associated with the first radio load being determined to have been satisfied, the method can facilitate, by the mobile device, receiving second radio load data, indicative of a current radio load, from a second wireless device. Additionally, in response to a second condition associated with the current radio load being determined to have been satisfied, the method can utilize, by the mobile device, a second channel of the second wireless device for a communication.

20 Claims, 12 Drawing Sheets

(51) Int. Cl.
*H04W 28/08* (2009.01)
*H04W 72/08* (2009.01)
*H04W 72/04* (2009.01)
*H04W 36/24* (2009.01)
*H04W 48/20* (2009.01)
*G01S 19/04* (2010.01)

(52) U.S. Cl.
CPC ....... *H04W 36/30* (2013.01); *H04W 72/0493* (2013.01); *H04W 72/08* (2013.01); *G01S 19/04* (2013.01); *H04W 48/20* (2013.01)

(56) References Cited

U.S. PATENT DOCUMENTS

| | | | |
|---|---|---|---|
| 2008/0305747 A1* | 12/2008 | Aaron | H04W 24/08 455/67.13 |
| 2011/0319071 A1 | 12/2011 | Beppler et al. | |
| 2013/0336289 A1 | 12/2013 | Koifman et al. | |
| 2014/0033223 A1* | 1/2014 | Swart | G06F 9/5066 718/105 |
| 2014/0198657 A1* | 7/2014 | Ji | H04L 47/125 370/235 |
| 2015/0109940 A1* | 4/2015 | Okhravi | H04L 43/0888 370/252 |
| 2015/0111575 A1* | 4/2015 | Lei | H04W 28/08 455/436 |
| 2016/0127256 A1* | 5/2016 | Sharma | G06F 16/84 709/226 |
| 2016/0174110 A1 | 6/2016 | Sharma et al. | |
| 2016/0183281 A1 | 6/2016 | Yeh et al. | |
| 2016/0205593 A1 | 7/2016 | Kauppinen et al. | |
| 2016/0338068 A1 | 11/2016 | Cheng et al. | |
| 2016/0374132 A1 | 12/2016 | Yerrabommanahalli et al. | |
| 2016/0380820 A1 | 12/2016 | Horvitz et al. | |
| 2017/0013496 A1 | 1/2017 | Gupta | |
| 2017/0118689 A1 | 4/2017 | Zhang et al. | |
| 2017/0303135 A1 | 10/2017 | Melodia et al. | |
| 2019/0124664 A1* | 4/2019 | Wang | H04W 74/02 |

FOREIGN PATENT DOCUMENTS

| | | |
|---|---|---|
| CN | 104754765 A | 7/2015 |
| CN | 106717058 A | 5/2017 |
| CN | 107295590 A | 10/2017 |
| JP | 2014-535189 A | 12/2014 |
| JP | 2015-523807 A | 8/2015 |
| JP | 2016-506190 A | 2/2016 |
| JP | 2016-111488 A | 6/2016 |
| KR | 10-2016-0104016 | 9/2016 |
| WO | 2014075292 A1 | 5/2014 |

OTHER PUBLICATIONS

Im et al., "AMUSE: Empowering Users for Cost-Aware Offloading with Throughput-Delay Tradeoffs", IEEE Transactions on Mobile Computing, vol. 15, No. 5, May 1, 2016, pp. 1062-1076.

Non-Final Office Action received for U.S. Appl. No. 15/854,099 dated Mar. 14, 2019, 30 pages.

Final Office Action received for U.S. Appl. No. 15/854,099 dated Jul. 8, 2019, 33 pages.

International Search Report and Written Opinion received for PCT Application Serial No. PCT/US2018/062396 dated Feb. 11, 2019, 16 pages.

Non-Final Office Action received for U.S. Appl. No. 15/854,099 dated Oct. 10, 2019, 33 pages.

International Preliminary Report on Patentability for PCT Application Serial No. PCT/US2018/062396 dated Jul. 9, 2020, 10 pages.

Office Action dated Jul. 9, 2021 for Korean Application No. 10-2020-7018456, 7 pages.

Office Action dated Aug. 25, 2021 for India Application No. 202047025433, 7 pages.

Office Action dated Jun. 22, 2021 for Japanese Application No. 2020-535557, 20 pages (with translation).

Office Action dated Sep. 3, 2021 for Chinese Application No. 201880077288.9, 8 pages.

* cited by examiner

CONTROL OF WIRELESS FIDELITY ACCESS FOR 5G OR OTHER NEXT GENERATION NETWORK

RELATED APPLICATION

The subject patent application is a continuation of, and claims priority to, U.S. patent application Ser. No. 15/854,099, filed Dec. 26, 2017, and entitled "CONTROL OF WIRELESS FIDELITY ACCESS FOR 5G OR OTHER NEXT GENERATION NETWORK," the entirety of which application is hereby incorporated by reference herein.

TECHNICAL FIELD

This disclosure relates generally to facilitating wireless network communication. For example, this disclosure relates to facilitating cellular or wireless fidelity communication based on channel selection for a 5G, or other next generation network.

BACKGROUND in cellular telecommunications, handover refers to the process of transferring an ongoing call or data session from one channel connected to the core network to another channel. In satellite communications it is the process of transferring satellite control responsibility from one earth station to another without loss or interruption of service. The most basic form of handover is when a phone call in progress is redirected from its current cell to a new cell. In terrestrial networks the source and the target cells may be served from two different cell sites or from one and the same cell site. Such a handover, in which the source and the target are different cells is called inter-cell handover. The purpose of inter-cell handover is to maintain the call as the subscriber is moving out of the area covered by the source cell and entering the area of the target cell. A special case is possible, in which the source and the target are one and the same cell and only the used channel is changed during the handover, Such a handover, in which the cell is not changed, is called intra-cell handover. The purpose of intra-cell handover is to change one channel, which may be interfered or fading with a new clearer or less fading channel.

The above-described background relating to cellular communication is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
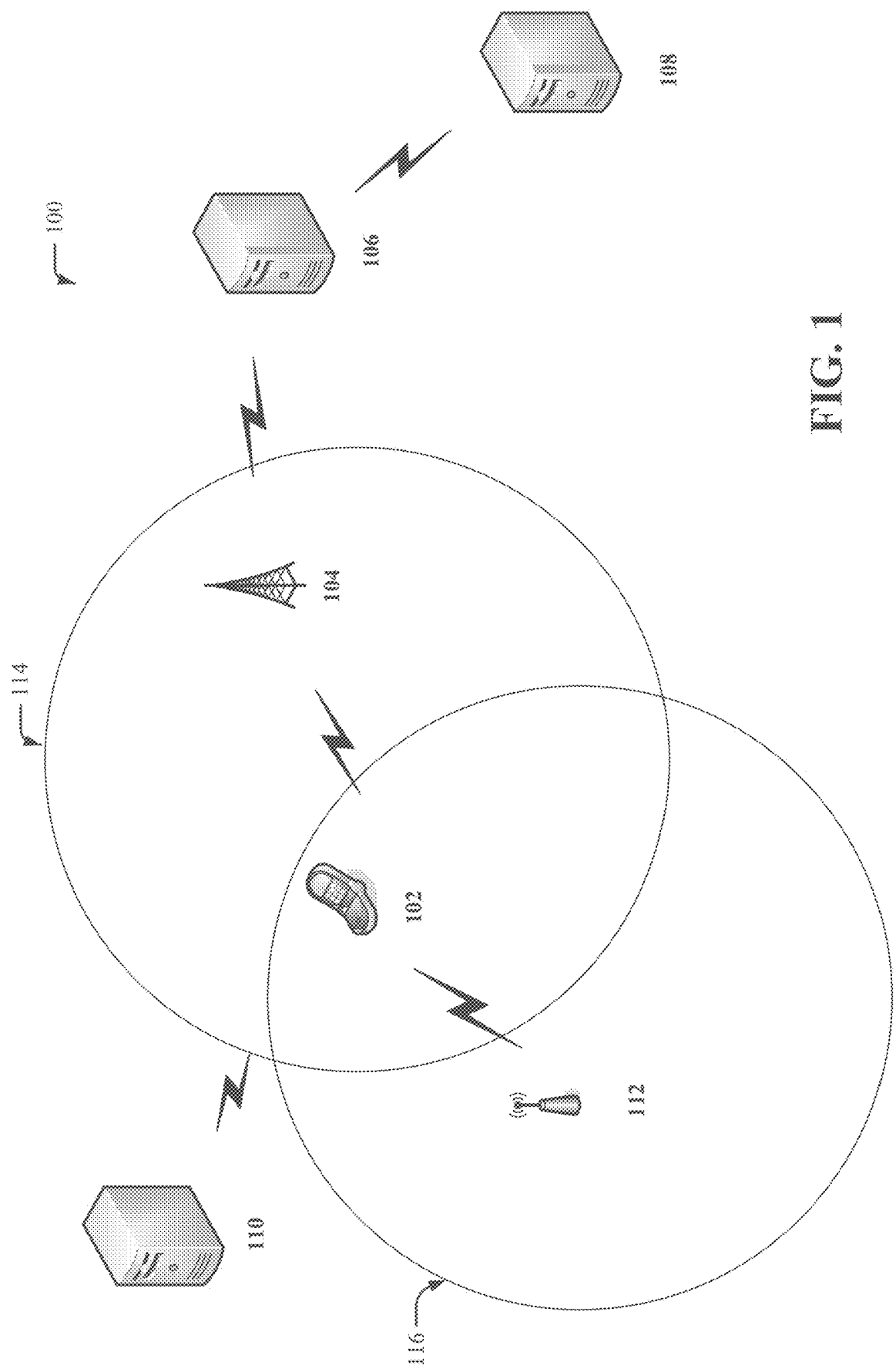
FIG. 1 illustrates an example wireless communication system in which a mobile device communicates via a cellular base station device according to one or more embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate communication over a cellular network or a wireless fidelity device for 5G or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate communication over a cellular network or a wireless fidelity device for a 5G network. Facilitating communication over a cellular network or a wireless fidelity device for a 5G network can be implemented in connection with any type of device with a connection to the communications network (e.g., a mobile handset, a computer, a handheld device, etc.) any Internet of things (JOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

Cloud radio access networks (RAN) can enable the implementation of concepts such as software-defined network (SDN) and network function virtualization (NFV) in 5G networks. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

Radio (e.g., cellular or Wi-Fi) loading information, including average and standard deviation of a load over a prescribed duration (e.g. 1 minute) and a longer term trend (e.g. 10-15 minutes), can be made available to be used for estimating near term load on a radio (e.g., perhaps 0-5 minutes forward-looking). A predictive load can be made accessible with three different embodiments. The first embodiment allows a mobile device software "link chooser" application to receive the loading information via a cellular radio broadcast channel. An alternative embodiment is for the software application to use a dedicated cellular communication channel to query a server for the load information for a specific cellular or service provider owned radio. For example, the software application can use an electronic cell global identity (eCGI) of the radio to perform the query. The third embodiment allows another Wi-Fi owner (e.g. Comcast) to query a service provider (e.g., carrier) server and request authorization to allow a mobile device to connect to the Wi-Fi owner's Wi-Fi (for which the service provider can pay a usage fee).

With regards to the first embodiment, a mobile device can be in the coverage area of a cellular radio and on or more Wi-Fi radios. Rather than transmitting packet data over each of the radio links using cellular radio resources to determine which radio link to use, the mobile device can monitor radio loading and/or radio performance information and broadcast on a common cellular radio channel of the serving cellular radio. If the broadcast loading statistics are favorable, the mobile device can remain on the cellular radio and not waste resources testing the cellular and Wi-Fi interfaces. However, if the cellular radio performance is poor, the mobile device can test the available cellular and Wi-Fi interfaces (e.g., either carrier owned or non-carrier owned WI-FI). The Wi-Fi device could be proprietary (e.g. owned by Comcast) or could be open (e.g., unsecured).

With regards to the second embodiment, the mobile device can communicate with one or more remote server devices within the carrier infrastructure to discover the cellular and carrier-owned WI-FI radio loading and performance information. This scenario utilizes dedicated cellular radio resources, but the returned information can comprise statistics gathered over time on the carrier-owned Wi-Fi radios. This is more efficient than the brief link testing information that can be gathered by the single mobile device (non-statistical) testing the available links by communicating with the remote servers via those links. With regards to the first or second embodiments, the mobile device is able to access and utilize carrier-owned radio (e.g., cellular or Wi-Fi) statistics as inputs to a scoring algorithm and determine whether to use one of the carrier owned radio links or test and/or use a non-carrier owned radio link. This scenario allows the mobile devices to remain on the cellular or Wi-Fi radios when conditions are acceptable to do so, with the result of the service provider having visibility into the mobile device performance. If the mobile device transitions to a non-carrier owned Wi-Fi, perhaps because it has slightly lower latency and packet retransmission, the end-user difference of experience can be trivial while the service provider can completely lose visibility into the end-user experience. Thus, for these two embodiments, either broadcasted or queried current load and performance statistics can be utilized as inputs to the algorithm, which can improve decisions regarding connecting to cellular radios, carrier-owned Wi-Fi devices, or non-carrier-owned Wi-Fi devices.

In cases where loading or performance information is "close" on different radios, the trend information can be very meaningful for near-term predicted link behavior. For example, assume it is near lunchtime and cellular radio usage is trending up, while Wi-Fi device use in an office is trending down (due to people leaving for lunch). Stationary mobile devices can then be biased to an equal or even slightly worse quality Wi-Fi connection, because the Wi-Fi connections will be trending towards a better user-experience (due to less mobile devices being connected to the Wi-Fi devices) while the cellular radio outside is trending towards a reduced user experience (due to more mobile devices utilizing the cellular radio). The determination of a mobile device's location (e.g., stationary, in motion, current destination, predicted destination, etc.) can be determined by either looking at global positioning system (GPS) location changes, location changes implied by positioning reference signal differences (e.g., differential time difference of arrival, hyperbolic multi-lateration, etc.) or by monitoring the signal strengths from multiple Wi-Fi nodes and looking for stability.

The third embodiment allows the owner of the non-carrier-owned Wi-Fi device to send a query to the service provider network server for a decision to permit or deny the connection of one of the service provider customer's mobile devices to access the non-carrier-owned Wi-Fi. This server can be the same server used in the second embodiment, since this is the server that can maintain the real-time loading and performance statistics for the cellular and carrier-owned Wi-Fi radios. However, the server functionality can be distributed or maintained on a single server or multiple servers. The distinction in functionality for the third embodiment is that the loading and performance information is not sent to the requesting Wi-Fi carrier. A decision is made on the service provider server side to approve or deny the connection request based on the same underlying information. To address the problem of Wi-Fi out-collect expense for Wi-Fi roaming to one or more Wi-Fi partners, the service provider can introduce a mechanism which invokes a random number generator or other "fair" control mechanism after deciding if a mobile device is permitted to connect to a Wi-Fi partner's Wi-Fi device. For example, if the service provider is spending too much for a Wi-Fi partner, and if the service provider wishes to reduce its expenses by 2% next month in a specific geographical market only, then the service provider can insert rules that state when service provider mobile devices are otherwise allowed to roam to the Wi-Fi partner's Wi-Fi devices.

In one embodiment, a system can facilitate, receiving predicted radio load data associated with a predicted radio load of a channel of a first wireless communication device. In response to a first condition associated with the predicted radio load being determined to have been satisfied, the system can receive current radio load data, indicative of a current radio load, from a second wireless communication device. Consequently, in response to a second condition associated with the current radio load being determined to have been satisfied, the system can perform an action.

According to another embodiment, described herein is a machine-readable storage medium that can perform the operations comprising receiving first radio load data representative of a future radio load associated with a channel of a first base station device. In response to a first condition associated with the future radio load being determined to have been satisfied, the machine-readable storage medium can receive second radio load data, indicative of a present radio load, from a server device associated with a second base station device. Furthermore, in response to a second condition associated with the present radio load being determined to have been satisfied, the machine-readable storage medium can facilitate a transmission over a second channel associated with the second base station device.

In yet another embodiment, described herein is a method comprising receiving, by a mobile device comprising a processor, first radio load data associated with a predicted radio load of a first channel of a first wireless device. Based on a first condition associated with the first radio load being determined to have been satisfied, the method can facilitate, by the mobile device, receiving second radio load data, indicative of a current radio load, from a second wireless device. Additionally, in response to a second condition associated with the current radio load being determined to have been satisfied, the method can utilize, by the mobile device, a second channel of the second wireless device for a communication.

These and other embodiments or implementations are described in more detail below with reference to the drawings.

Referring now to FIG. 1, illustrated is an example wireless communication system in which a mobile device communicates via a cellular base station device according to one or more embodiments of the subject disclosure.

As FIG. 1 depicts, a system 100 can comprise a mobile device 102, a base station device 104 of a cellular network, a carrier owned Wi-Fi device 112, and server devices 106, 108, 110. If the mobile device 102 is in the coverage areas 114, 116 of the base station device 104 and the carrier owned Wi-Fi device 112, then rather than transmitting packet data over the base station device 104 and the carrier owned Wi-Fi device 112 radio links, the mobile device 102 can use cellular radio resources, to decide which radio link to use.

The mobile device 102 can monitor radio loading and/or radio performance data associated with the base station device 104 and the carrier owned Wi-Fi device 112 by sending radio load request data to the base station device 104. The mobile device 102 can then broadcast on a common cellular radio channel of the serving base station device 104. If the broadcast loading statistics for the base station device 104 are favorable, the mobile device 102 can remain on the cellular radio and not waste resources testing each of the cellular and service provider Wi-Fi device interfaces. However, if the cellular radio performance is poor, the mobile device 102 can test the available cellular and Wi-Fi interfaces (e.g., either carrier-owned or non-carrier owned Wi-Fi).

The aforementioned determination can be based on radio (e.g., cellular or Wi-Fi) loading information, comprising average and/or standard deviation of a network load over a determined duration and/or trends associated with the loading information. This data can be used to estimate near term load on the radio. Therefore the mobile device 102 can make forward-looking decisions about which device (e.g., cellular or Wi-Fi) to connect to, terminate, and/or remain on based on the loading information.

The mobile device 102 can predict the load based on receiving the information (e.g., loading and performance statistics) via a cellular radio broadcast channel. The base station device 104 can communicate with the server device 106. The server device 106 can be a radio access network (RAN) server device that communicates with the base station device 104 and the service provider server device 108, which can be a service provider server device. Collected and current radio loading and performance data from all connected devices (e.g., base station device 104) can be stored at the service provider server device 108. For example, historical cellular coverage associated with the base station device 104 and service provider business rules that throttle the number of connections (e.g., per Wi-Fi partner, market, geographical area, etc.) to the base station device 104 can be stored at the service provider server device 108. Alternatively, the mobile device 102 can ping another server device 110 over the Internet to test for throughput, latency, and/or frame error rates (FER). This test can be performed by the mobile device 102 independently of the aforementioned network provider information and then compared to the network provider information to determine the best link to choose.

Figure 2:
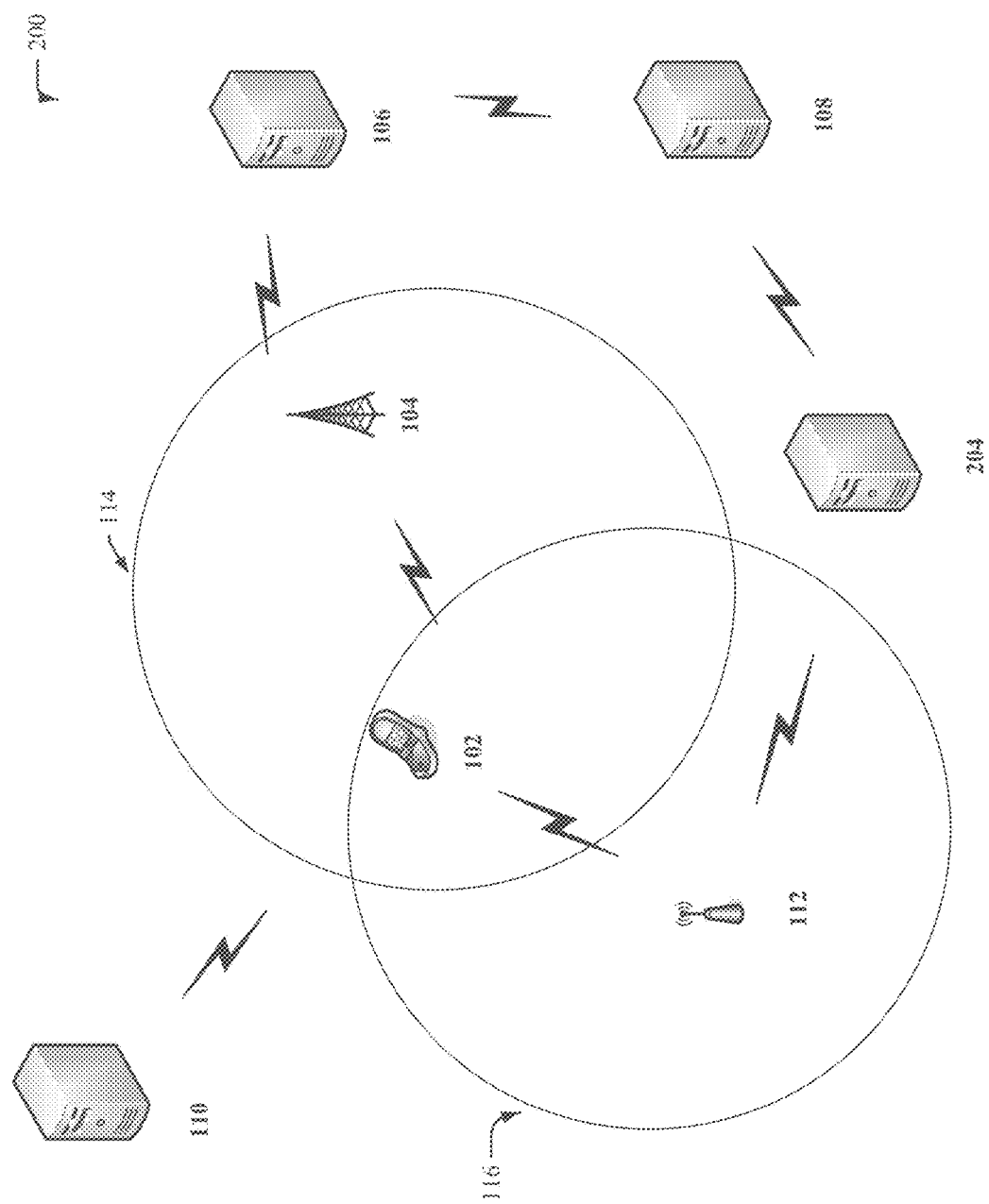
FIG. 2 illustrates an example wireless communication system in which a mobile device communicates via a carrier owned wireless fidelity device according to one or more embodiments of the subject disclosure.

Referring now to FIG. 2, illustrated is an example wireless communication system in which a mobile device communicates via a carrier owned wireless fidelity device according to one or more embodiments of the subject disclosure. Repetitive description of like elements employed in other embodiments described herein is omitted for sake of brevity.

In another embodiment as represented in system 200, the mobile device 102 can communicate with one or more remote server devices 106, 108, 110, 204 within the carrier infrastructure to discover the cellular and carrier-owned Wi-Fi radio loading and performance information. The returned data can comprise statistics gathered over time on the carrier-owned Wi-Fi radios and the base station device 104. The mobile device 102 can access and utilize the carrier-owned radio (e.g., base station device 104 or carrier owned Wi-Fi device 112) statistics as inputs to a scoring algorithm and determine whether to use one of the carrier-owned radio links for the base station device 104 or test and/or use the carrier-owned Wi-Fi link. For example, the mobile device 102 can then compare load data of the base station 104 to load data of the carrier owned Wi-Fi device 112 to determine which channel to utilize for communication.

If the mobile device 102 is in the coverage areas 114, 116 of the base station device 104 and the carrier owned Wi-Fi device 112, then rather than transmitting packet data over the base station device 104 and the carrier owned Wi-Fi device 112 radio links, the mobile device 102 can use cellular radio resources to decide which radio link to use. The mobile device 102 can monitor radio loading and/or radio performance data associated with the base station device 104 and the carrier owned Wi-Fi device 112. The mobile device 102 can then broadcast on a common cellular radio channel of the serving base station device 104. If the broadcast loading statistics for the base station device 104 are favorable, the mobile device 102 can remain on the cellular radio and not waste resources testing the cellular and service provider Wi-Fi device interfaces. However, if the cellular radio performance is poor, the mobile device 102 can test the available cellular and Wi-Fi interfaces (e.g., either carrier-owned). Historical service data associated with the carrier owned Wi-Fi device 112 can be stored at a Wi-Fi service provider server device 204 and/or transmitted to the service provider server device 108 to be stored.

Thus, the mobile device 102 can remain on the cellular or Wi-Fi radios when conditions are acceptable to do so. If the mobile device 102 transitions to a non-carrier-owned Wi-Fi device as shown with regard to FIG. 3 below, the service provider can completely lose visibility into the end-user experience. Therefore, either broadcasted or queried current and/or previous load and performance statistics can be utilized as inputs for the mobile device to determine whether to connect to cellular radios or carrier-owned Wi-Fi devices as depicted by FIG. 2.

Selection of cellular or Wi-Fi services can be based on radio (e.g., cellular or Wi-Fi) loading information, comprising average and/or standard deviation of a network load over a determined duration and/or trends associated with the loading information. This data can then be used to estimate near term load on the radio. Therefore the mobile device 102 can make forward-looking decisions about which device (e.g., base station device 104 or carrier owned Wi-Fi device 112) to connect to, terminate, and/or remain on based on the loading information.

The mobile device 102 can predict the load of the base station device 104 or the carrier owned Wi-Fi device 112 based on receiving historical information (e.g., loading and performance statistics) via the cellular radio broadcast channel associated with the base station device 104. The base station device 104 can communicate with the server device 106, and the server device 106 can communicate with the service provider server device 108. Collected and current radio loading and performance data from all connected devices (e.g., base station device 104, carrier owned Wi-Fi device 112) can be stored at the service provider server device 108. For example, historical cellular coverage associated with the base station device 104 and the carrier owned Wi-Fi device 112 can be stored at the service provider server device 108. The historical cellular coverage data can be received by the service provider server device 108 from the server device 106 and historical Wi-Fi coverage data can be received by the service provider server device 108 from the service provider Wi-Fi server device 108. The mobile device 102 can also communicate with the service provider server device 204. Alternatively, the mobile device 102 can ping another server device 110 over the Internet to test for throughput, latency, and/or FER. This test can be performed by the mobile device 102 independently of the aforementioned service provider information and then compared to the service provider information and/or the Wi-Fi information to determine the best link to choose.

Figure 3:
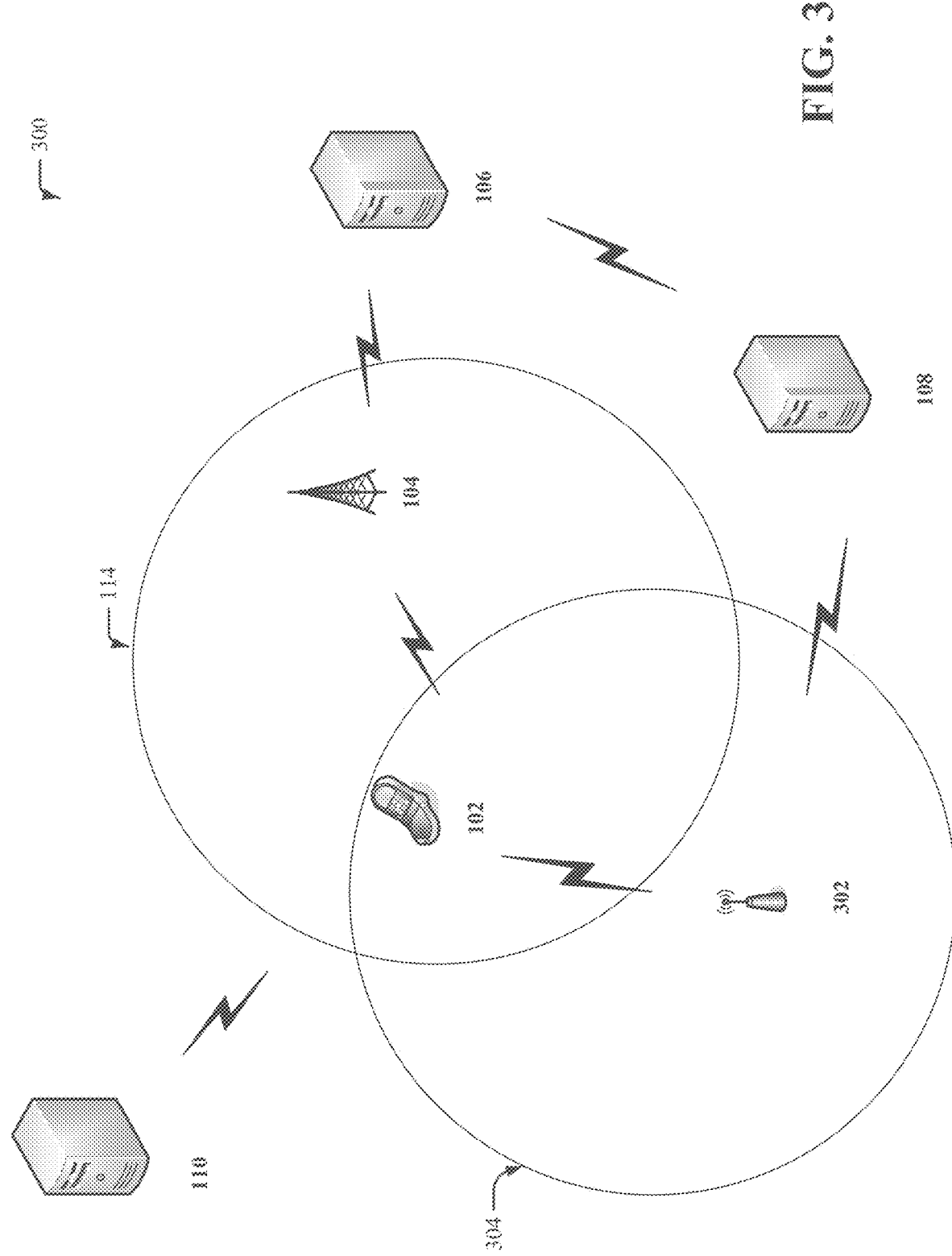
FIG. 3 illustrates an example wireless communication system in which a mobile device communicates via a non-carrier owned wireless fidelity device according to one or more embodiments of the subject disclosure.

Referring now to FIG. 3, illustrated is an example wireless communication system in which a mobile device communicates via a non-carrier owned wireless fidelity device according to one or more embodiments of the subject disclosure. Repetitive description of like elements employed in other embodiments described herein is omitted for sake of brevity.

In another embodiment as represented in system 300, the mobile device 102 can communicate with one or more remote server devices 106, 108, 110 within the carrier infrastructure to discover the cellular and non-carrier owned Wi-Fi radio loading and performance information. The returned data can comprise statistics gathered over time on a non-carrier owned Wi-Fi device 302 and the base station device 104. The mobile device 102 can access the base station device 104 or non-carrier owned Wi-Fi device 302 statistics as inputs to a scoring algorithm and ultimately decide whether to use one of the carrier-owned radio links or test and/or use the carrier-owned Wi-Fi link. For example, the mobile device 102 can then compare load data of the base station 104 to load data of the non-carrier owned Wi-Fi device 302 to determine which channel to utilize for communication.

If the mobile device 102 is in the coverage areas 114, 304 of the base station device 104 and the non-carrier owned Wi-Fi device 302, then rather than transmitting packet data over the base station device 104 and the non-carrier owned Wi-Fi device 302 radio links, the mobile device 102 can use cellular radio resources, to decide which radio link to use. The mobile device 102 can monitor radio loading and/or radio performance data associated with the base station device 104 and the non-carrier owned Wi-Fi device 302. The mobile device 102 can then broadcast on a common cellular radio channel of the serving base station device 104. If the broadcast loading statistics for the base station device 104 are favorable, the mobile device 102 can remain on the cellular radio and not waste resources testing each of the cellular and non-carrier owned Wi-Fi interfaces. However, if the cellular radio performance is poor, the mobile device 102 can test the available cellular and Wi-Fi interfaces (e.g., either carrier-owned or other-provider Wi-Fi). Historical service data associated with the non-carrier owned Wi-Fi device 302 can be transmitted to the service provider server device 108 to be stored for access by the mobile device 102.

Thus, the mobile device 102 can remain on the cellular or Wi-Fi radios when conditions are acceptable to do so. If the mobile device 102 transitions to a non-carrier-owned Wi-Fi as depicted in FIG. 3, the service provider can completely lose visibility into the end-user experience. However, if previous non-carrier owned Wi-Fi device 302 data is stored at the service provider server device 108, then the mobile device 102 can make an informed selection decision and the service provider does not lose visibility into the user experience. Therefore, either broadcasted or queried current and/or previous load and performance statistics can be utilized as inputs for the mobile device to determine whether to connect to cellular radios or non-carrier owned Wi-Fi devices. Thus, based on trends, historical load data, and predictive analysis data stored at the service provider server device, the mobile device can switch channels to communicate with the non-carrier owned Wi-Fi device 302. The predication can be performed by the mobile device 102 itself, based on the received data from the service provider server device 108, or the predication can be performed by service provider server device 108 and sent to the mobile device. It should be noted that the aforementioned prediction scenario can be applied to all embodiments herein.

Selection of cellular or Wi-Fi services can be based on radio (e.g., cellular or Wi-Fi) loading information, comprising average and/or standard deviation of a network load over a determined duration and/or trends associated with the loading information. This data can then be used to estimate near term load on the radio. Therefore the mobile device 102 can make forward-looking decisions about which device (e.g., base station device 104 or non-carrier owned Wi-Fi device 302) to connect to, terminate, and/or remain on based on the loading information.

The mobile device 102 can predict the load of the base station device 104 or the non-carrier owned Wi-Fi device 302 based on receiving information (e.g., loading and performance statistics) via the cellular radio broadcast channel associated with the base station device 104. The base station device 104 can communicate with the server device 106, and the server device 106 can communicate with the service provider server device 108. Historical and current radio loading and performance data from all connected devices (e.g., base station device 104, non-carrier owned Wi-Fi device 302) can be stored at the service provider server device 108. For example, historical cellular coverage data associated with the base station device 104 and the non-carrier owned Wi-Fi device 302 can be stored at the service provider server device 108. The historical cellular coverage data can be received by the service provider server device 108 from the server device 106, and historical Wi-Fi coverage data can be received by the service provider server device 108 directly from the non-carrier owned Wi-Fi device 302. The mobile device 102 can also communicate with the non-carrier owned Wi-Fi device 302. Alternatively, the mobile device 102 can ping another server device 110 over the Internet to test for throughput, latency, and/or FER. This test can be performed by the mobile device 102 independently of the aforementioned service provider information and then compared to the service provider information and/or the Wi-Fi information to determine the best link to choose.

Figure 4:
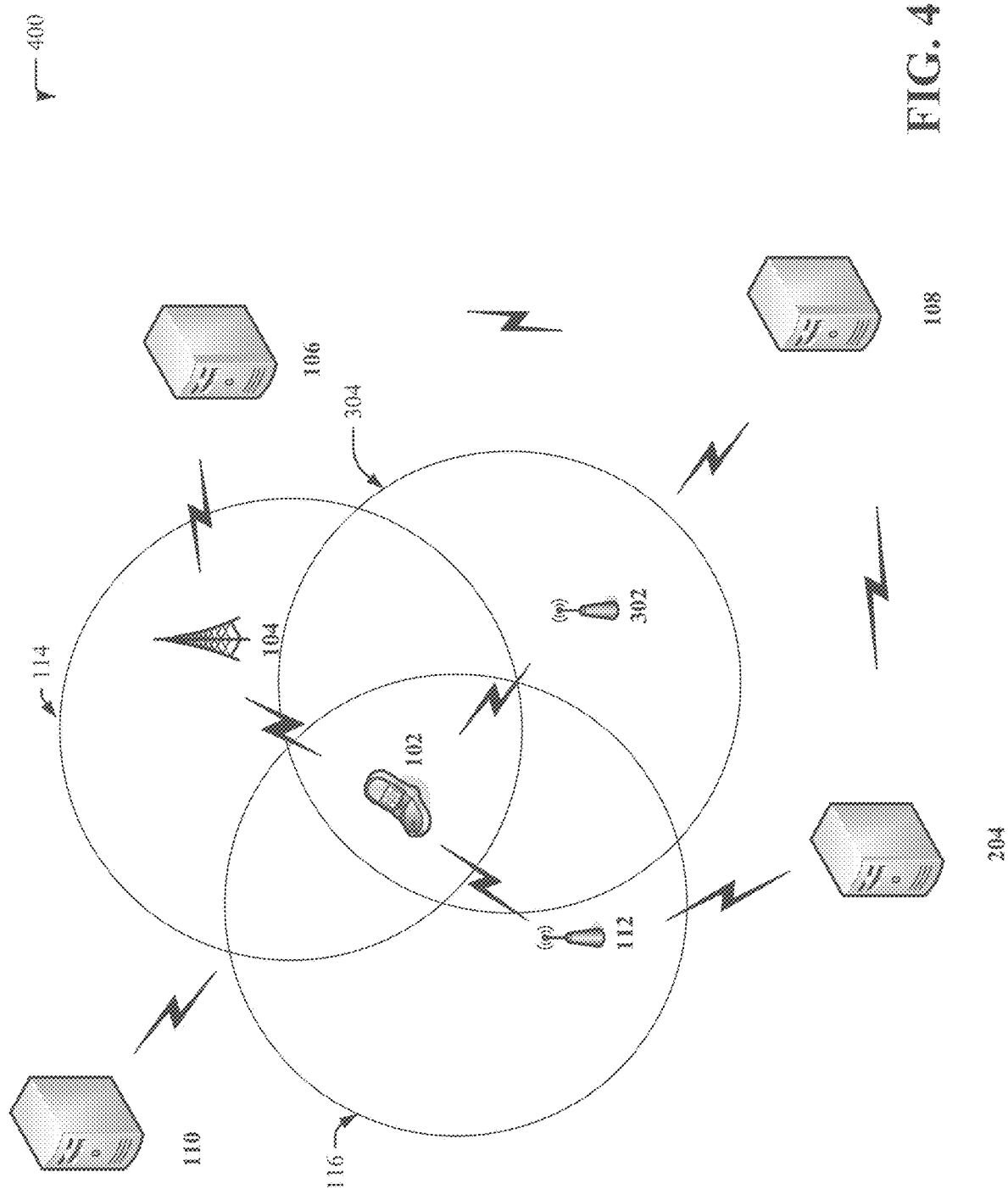
FIG. 4 illustrates an example wireless communication system in which a mobile device can communicate via a cellular base station device, a carrier owned wireless fidelity device, and/or a non-carrier owned wireless fidelity device according to one or more embodiments of the subject disclosure.

Referring now to FIG. 4, illustrated is an example wireless communication system in which a mobile device can communicate via a cellular base station device, a carrier owned wireless fidelity device, and/or a non-carrier owned wireless fidelity device according to one or more embodiments of the subject disclosure.

In another embodiment as represented in system 400, the mobile device 102 can communicate with one or more remote server devices 106, 108, 110, 204 within the carrier infrastructure to discover the cellular, carrier-owned, and/or non-carrier owned Wi-Fi radio loading and performance information. The returned data can comprise statistics gathered over time on a non-carrier owned Wi-Fi device 302, a carrier owned Wi-Fi device 112, and/or the base station device 104. The mobile device 102 can access and utilize the base station device 104, non-carrier owned Wi-Fi device 302, and/or the carrier owned Wi-Fi device 112 statistics as inputs to a scoring algorithm and ultimately determine whether to use one of the carrier-owned radio links or test and/or use the carrier-owned or non-carrier owned Wi-Fi radio link.

If the mobile device 102 is in the coverage areas 114, 116, 304 of the base station device 104, the non-carrier owned Wi-Fi device 302, and the carrier owned Wi-Fi device 112, then rather than transmitting packet data over the base station device 104, the non-carrier owned Wi-Fi device 302, and/or the carrier owned Wi-Fi device 112 radio links, the mobile device 102 can use cellular radio resources to determine which radio link to use. The mobile device 102 can monitor radio loading and/or radio performance data associated with the base station device 104, the non-carrier owned Wi-Fi device 302, and/or the carrier owned Wi-Fi device 112. The mobile device 102 can then broadcast on a common cellular radio channel of the serving base station device 104. If the broadcast loading statistics for the base station device 104 are favorable, the mobile device 102 can remain on the cellular radio and not waste resources testing each of the cellular and non-carrier or carrier owned Wi-Fi interfaces. However, if the cellular radio performance is poor, the mobile device 102 can test the available cellular and Wi-Fi interfaces. Historical service data associated with the non-carrier owned Wi-Fi device 302 can be transmitted to the service provider server device 108 to be stored for access by the mobile device 102. Historical service data associated with the carrier owned Wi-Fi device 112 can also be transmitted to Wi-Fi service provider server device 204 and then transmitted and stored at the service provider server device 108.

Consequently, the mobile device 102 can remain on the cellular or Wi-Fi radios when conditions are acceptable to do so. If previous non-carrier owned Wi-Fi device 302 data or the carrier owned Wi-Fi device 112 data is stored at the service provider server device 108, then the mobile device 102 can make an informed selection decision and the service provider does not lose visibility into the user experience. Therefore, either broadcasted or queried current and/or previous load and performance statistics can be utilized as inputs for the mobile device to determine whether to connect to cellular radios, non-carrier owned Wi-Fi devices, or carrier owned Wi-Fi devices.

The mobile device 102 can predict the load of the base station device 104, the non-carrier owned Wi-Fi device 302, and/or the carrier owned Wi-Fi device 112 based on receiving information (e.g., loading and performance statistics) via the cellular radio broadcast channel associated with the base station device 104. Historical and current radio loading and performance data from all connected devices (e.g., base station device 104, non-carrier owned Wi-Fi device 302, carrier owned Wi-Fi device 112) can be stored at the service provider server device 108. For example, historical cellular coverage associated with the base station device 104, the non-carrier owned Wi-Fi device 302, and/or the carrier owned Wi-Fi device 112 can be stored at the service provider server device 108. The historical cellular coverage data can be received by the service provider server device 108 from the server device 106, directly from the non-carrier owned Wi-Fi device 302, and/or from the carrier owned Wi-Fi device 112. The mobile device 102 can also communicate with the non-carrier owned Wi-Fi device 302 and the carrier owned Wi-Fi device 112. Alternatively, the mobile device 102 can ping another server device 110 over the Internet to test for throughput, latency, and/or FER. This test can be performed by the mobile device 102 independently of the aforementioned service provider information and then compared to the service provider information and/or the Wi-Fi information to determine the best link to choose.

Figure 5:
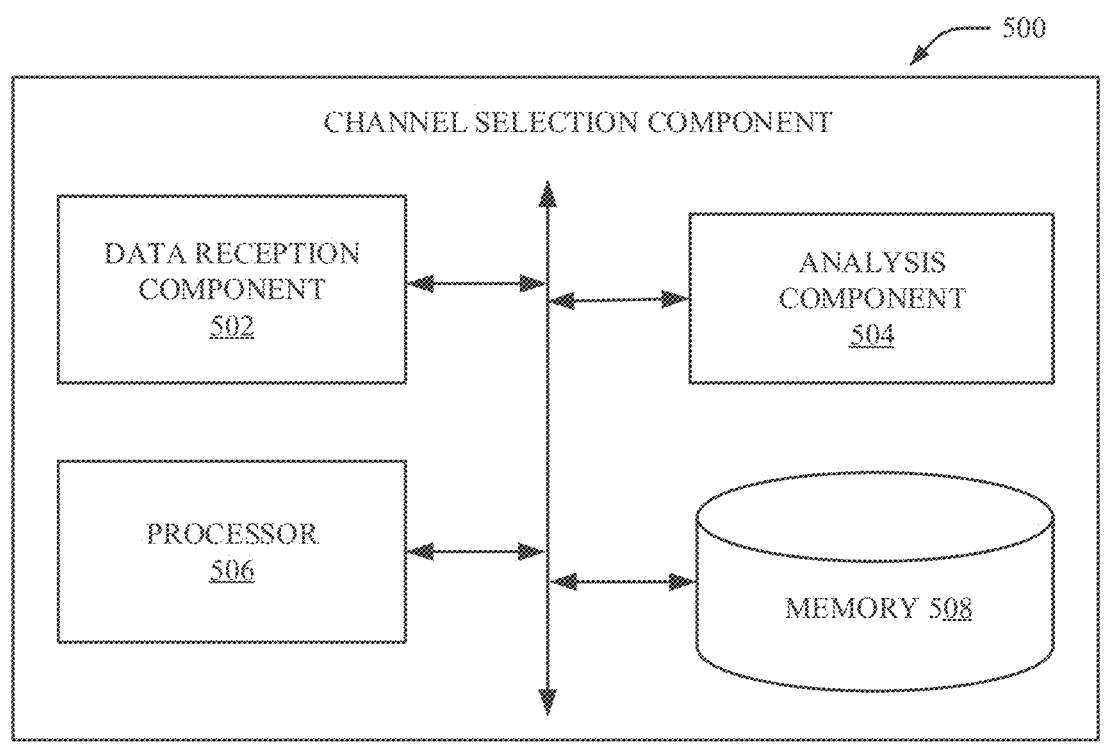
FIG. 5 illustrates an example schematic system block diagram of a channel selection component according to one or more embodiments.

Referring now to FIG. 5 illustrated is an example schematic system block diagram of a channel selection component. Repetitive description of like elements employed in other embodiments described herein is omitted for sake of brevity.

The channel selection component 500 can comprise several subcomponents (e.g., a data reception component 502, an analysis component 504, etc.), a processor 506 and a memory 508, which can be electrically and/or communicatively coupled to one another in various embodiments. It should also be noted that, in some embodiments, the subcomponents (e.g., a data reception component 502, an analysis component 504, etc.) can be external to the channel selection component 500.

The channel selection component 500 can be configured to select the base station device 104, the carrier owned Wi-Fi device 112, and/or the non-carrier owned Wi-Fi device 302 based on current and/or previous channel load data. For example channel load data associated with the base station device 104, the carrier owned Wi-Fi device 112, and/or the non-carrier owned Wi-Fi device 302 can be received by the channel selection component 500 via the data reception component 502. Consequently, the analysis component 504 can analyze the channel load data and determine if the channel load data has met, failed to meet, or exceeded a defined threshold. Based on whether the channel load data has met, failed to meet, or exceeded the defined threshold, a decision can be made by the channel selection component 500 to remain on a cellular channel or switch to a Wi-Fi channel for better quality of service.

Figure 6:
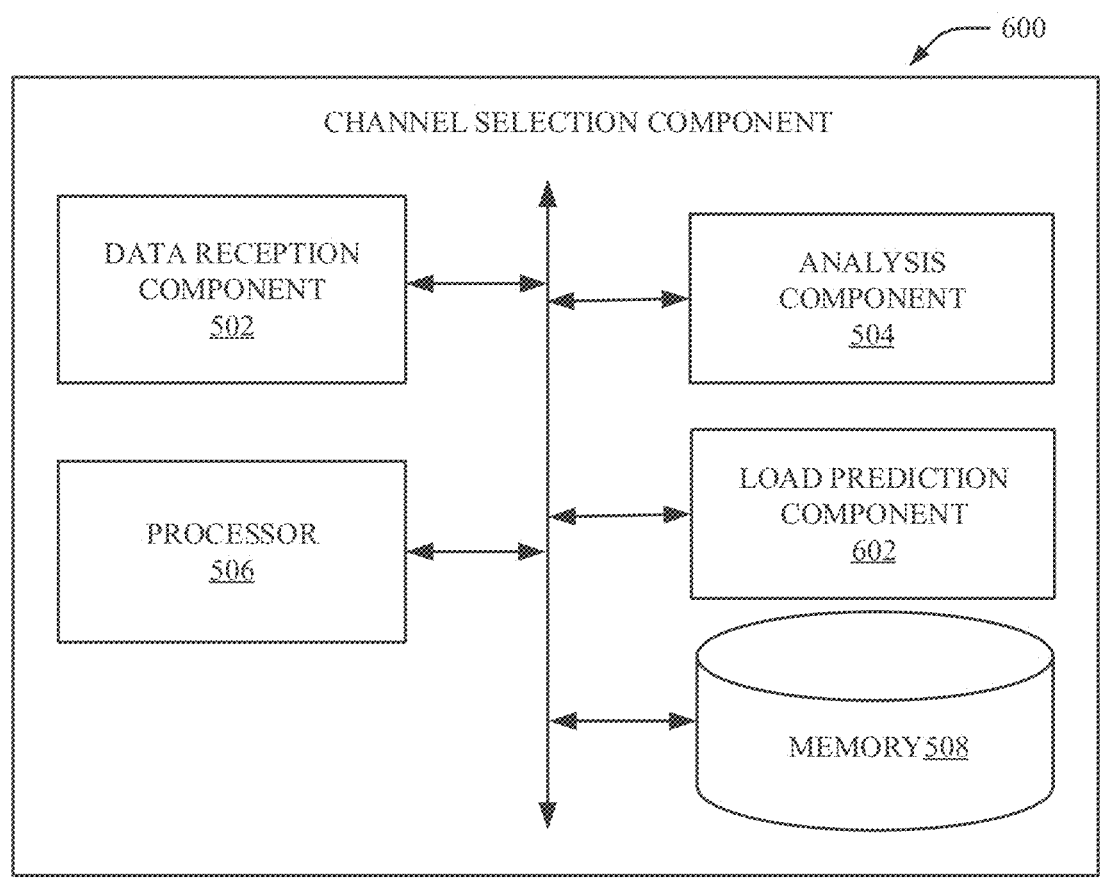
FIG. 6 illustrates an example schematic system block diagram of a channel selection component according to one or more embodiments.

Referring now to FIG. 6, illustrated is an example schematic system block diagram of a channel selection component. Repetitive description of like elements employed in other embodiments described herein is omitted for sake of brevity.

The channel selection component 600 can comprise several subcomponents (e.g., a data reception component 502, an analysis component 504, and a load prediction component 602, etc.), a processor 506 and a memory 508, which can be electrically and/or communicatively coupled to one another in various embodiments. It should also be noted that, in some embodiments, the subcomponents (e.g., a data reception component 502, an analysis component 504, the load prediction component 602, etc.) can be external to the channel selection component 600.

The channel selection component 600 can be configured to select the base station device 104, the carrier owned Wi-Fi device 112, and/or the non-carrier owned Wi-Fi device 302 based on current and/or previous channel load data. Additionally, the load prediction component 602 can predict future channel performance based on the current and/or previous channel data received by the data reception component 502. For example, the load prediction component 602 can predict that at 5:00 PM the base station device 104 will have a heavy load due to persons leaving work and traveling home. Therefore, based on GPS data, the channel selection component 600 can select a Wi-Fi device for communication with those mobile devices that are stationary (e.g., the mobile device user is working late).

Figure 7:
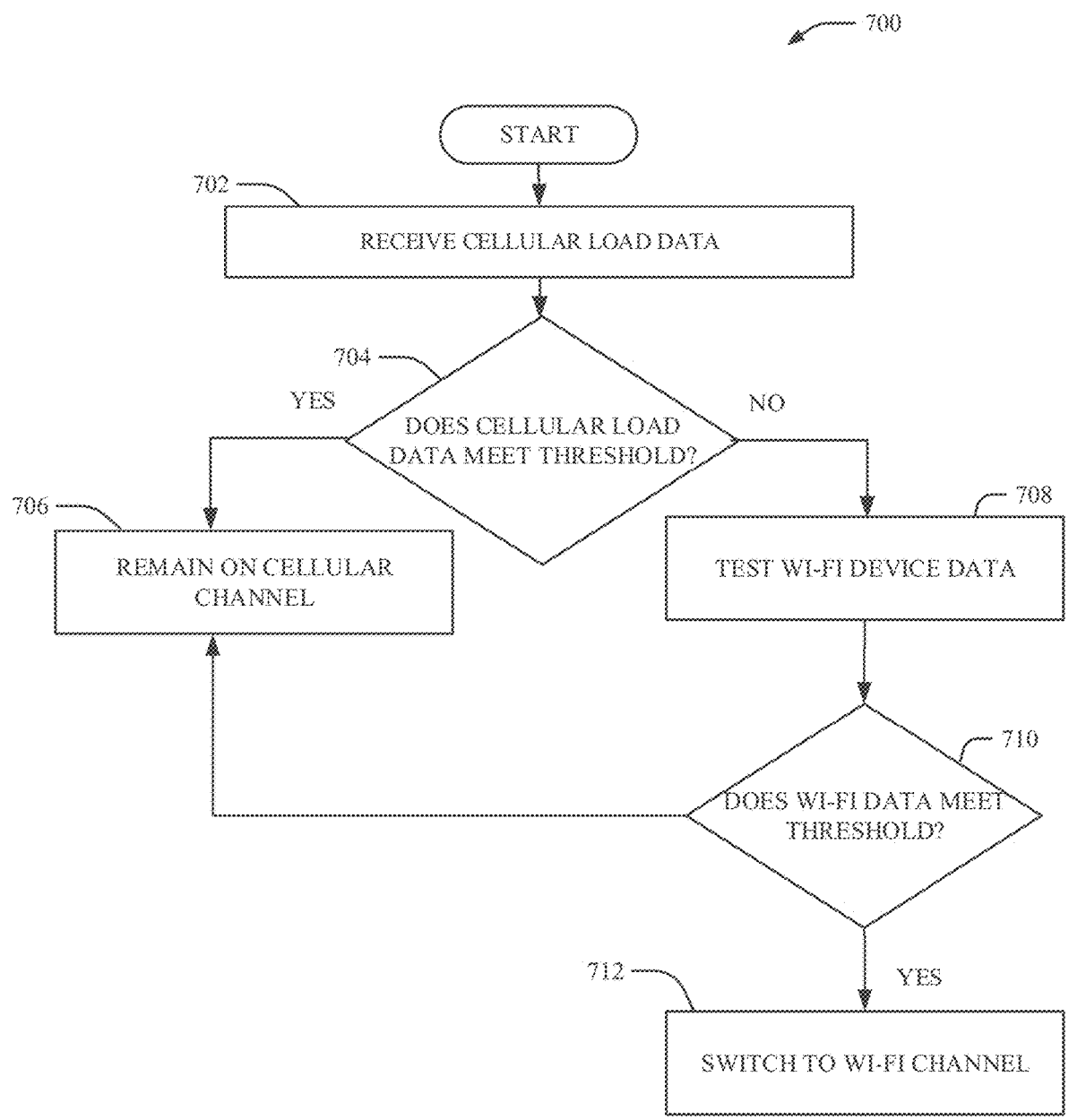
FIG. 7 illustrates an example schematic flow diagram of channel selection according to one or more embodiments.

Referring now to FIG. 7, illustrated is an example schematic flow diagram 700 of a channel selection component. Repetitive description of like elements employed in other embodiments described herein is omitted for sake of brevity.

At block 702, the system can receive cellular load data and determine if the cellular data meets a defined threshold at block 704. For example, if the broadcast loading statistics are favorable, the mobile device 102 can remain on the cellular channel at block 706 and not waste additional resources by testing each of the cellular and Wi-Fi interfaces. However, if the cellular radio performance is poor (e.g., the threshold data is not met), the mobile device 102 can test the available Wi-Fi data from the Wi-Fi devices (e.g., either carrier-owned or other-provider WI-FI) at block 708. The system can next determine if the Wi-Fi device data meets a threshold at block 710. If the Wi-Fi device data does not meet the threshold, then the system can remain on the cellular channel at block 706. However, if the Wi-Fi data does meet or exceed the threshold, then the system can switch to the Wi-Fi channel at block 712. The Wi-Fi devices can be proprietary (e.g. Comcast) or can be open (e.g., unsecured).

Figure 8:
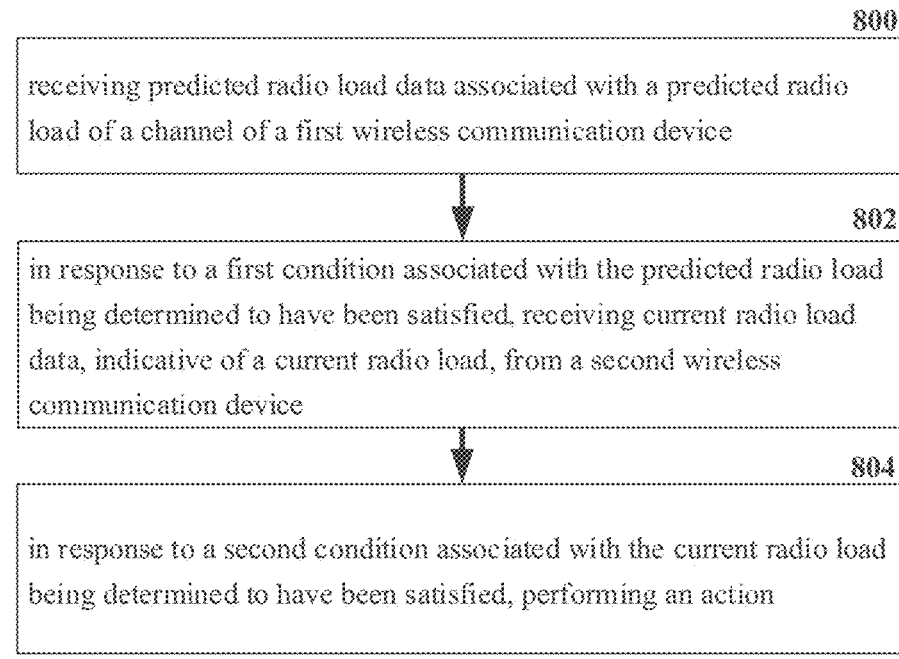
FIG. 8 illustrates an example flow diagram of a system for facilitating channel selection according to one or more embodiments.

Referring now to FIG. 8, illustrated is an example flow diagram of a system for facilitating channel selection. Repetitive description of like elements employed in other embodiments described herein is omitted for sake of brevity. At element 800, the system can comprise receiving (e.g., via the data reception component 502) predicted radio load data associated with a predicted radio load of a channel of a first wireless communication device. In response to a first condition associated with the predicted radio load being determined to have been satisfied, the system can comprise receiving (e.g., via the data reception component 502) current radio load data, indicative of a current radio load, from a second wireless communication device at element 802. Additionally, in response to a second condition associated with the current radio load being determined to have been satisfied, the system can comprise performing an action (e.g., via the channel selection component 500) at element 804.

Figure 9:
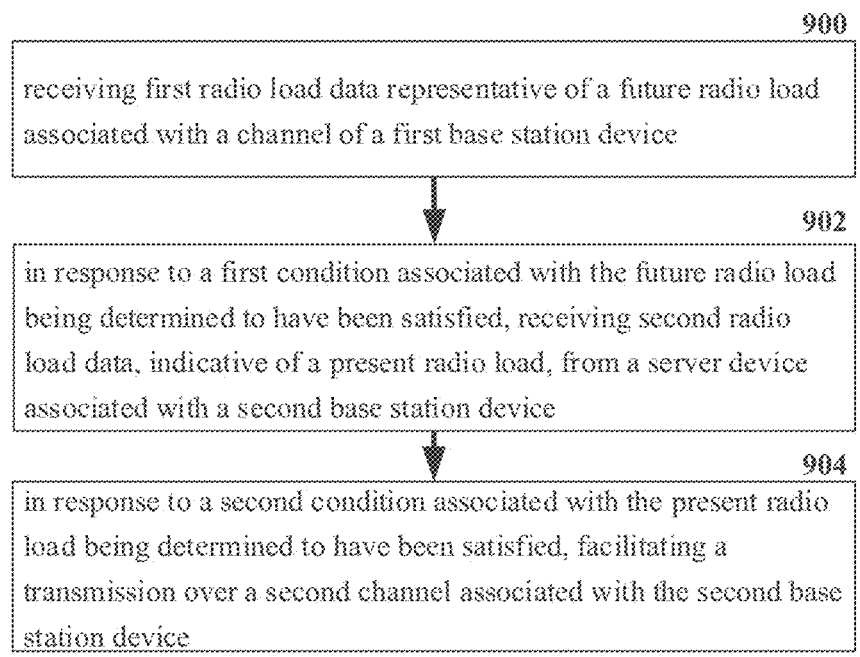
FIG. 9 illustrates an example flow diagram of a machine-readable medium for facilitating channel selection according to one or more embodiments.

Referring now to FIG. 9, illustrated is an example flow diagram for a machine-readable medium for facilitating channel selection. Repetitive description of like elements employed in other embodiments described herein is omitted for sake of brevity. At element 900, the machine-readable medium can comprise receiving (e.g., via the data reception component 502) first radio load data representative of a future radio load associated with a channel of a first base station device. In response to a first condition associated with the future radio load being determined to have been satisfied, the machine-readable medium can comprise receiving (e.g., via the data reception component 502) second radio load data, indicative of a present radio load, from a server device associated with a second base station device at element 902. Furthermore, in response to a second condition associated with the present radio load being determined to have been satisfied, the machine-readable medium can comprise facilitating a transmission (e.g., via the channel selection component 500) over a second channel associated with the second base station device at element 904.

Figure 10:
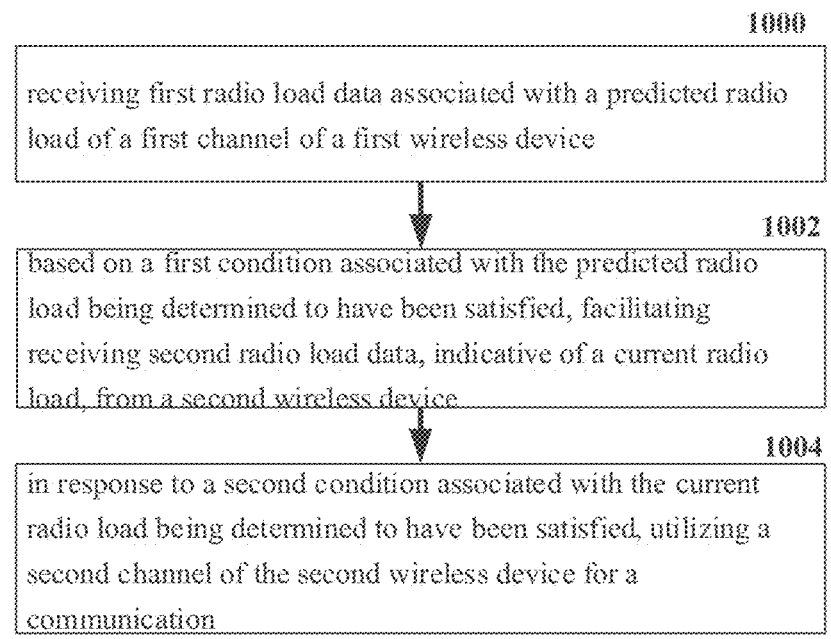
FIG. 10 illustrates is an example flow diagram of a method for facilitating channel selection according to one or more embodiments.

Referring now to FIG. 10, illustrated is an example flow diagram for a method for facilitating channel selection. Repetitive description of like elements employed in other embodiments described herein is omitted for sake of brevity. At element 1000, the method can comprise receiving (e.g., via the data reception component 502), by a mobile device comprising a processor, first radio load data associated with a predicted radio load of a first channel of a first wireless device. Additionally, based on a first condition associated with the predicted radio load being determined to have been satisfied, the method can comprise facilitating, by the mobile device, receiving (e.g., via the data reception component 502) second radio load data, indicative of a current radio load, from a second wireless device at element 1002. Furthermore, in response to a second condition associated with the current radio load being determined to have been satisfied, the method can comprise utilizing (e.g., via the channel selection component 500), by the mobile device, a second channel of the second wireless device for a communication at element 1004.

Figure 11:
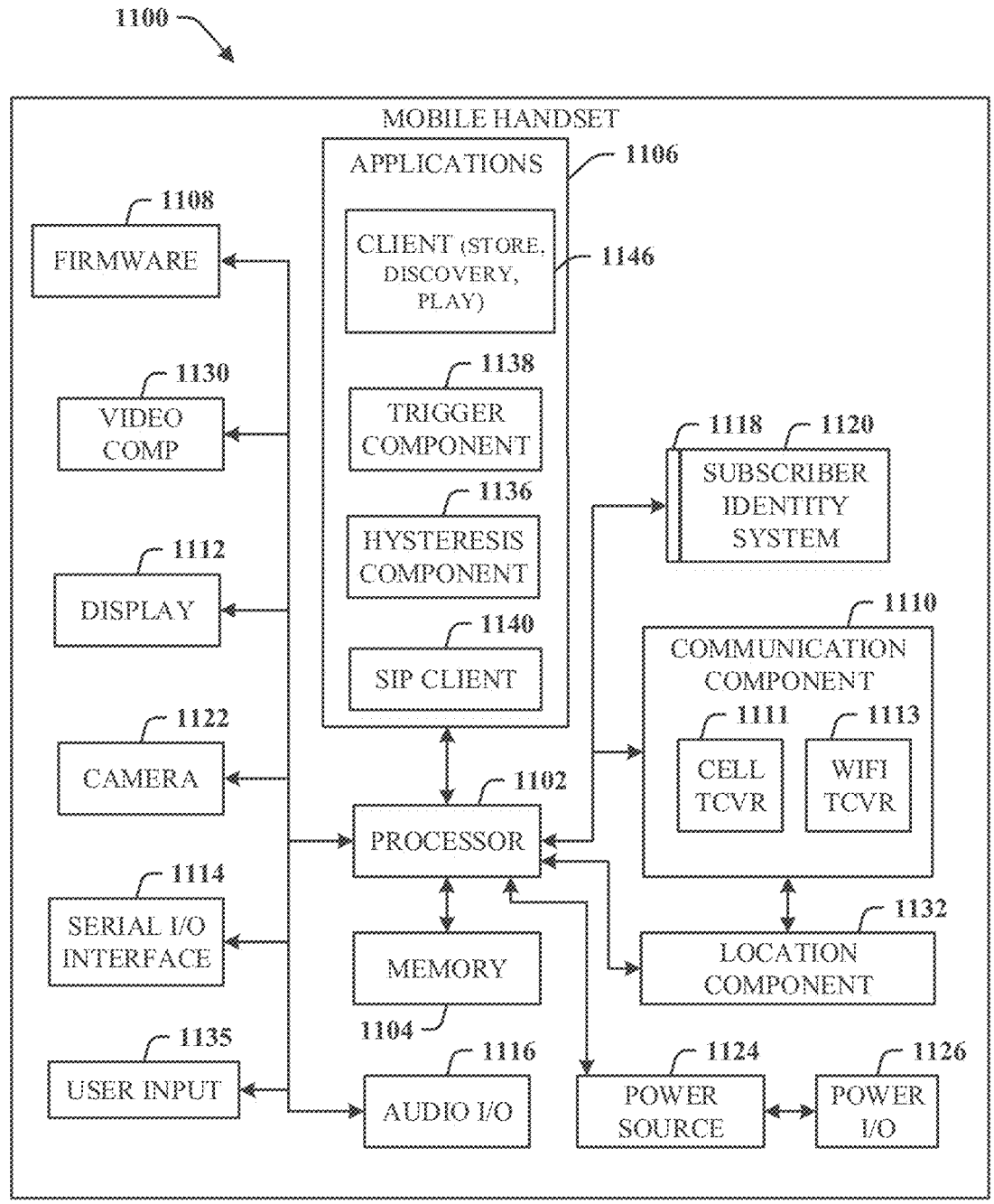
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
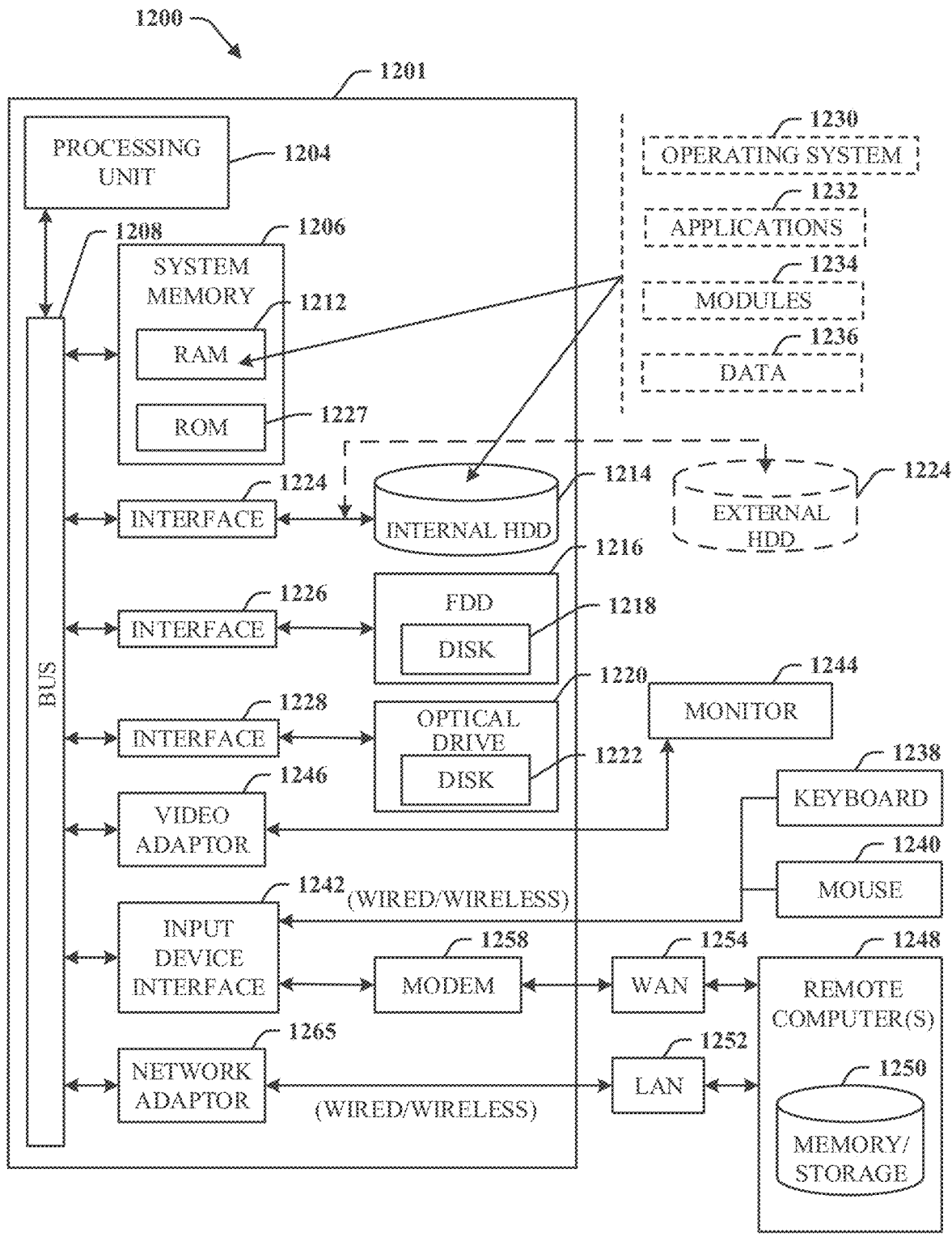
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Demands for packet data on mobile radio networks is driving large costs for mobile network carriers. Offloading voice and data traffic onto Wi-Fi radios alleviates capacity demands over cellular links with more limited bandwidth. Service provider customers can be permitted to migrate to proprietary Wi-Fi device connections for a fee. Mobile device software can make a decision to use cellular or Wi-Fi radios based upon limited tests (e.g., ping/acknowledgment, throughput, FER) observations possible by the mobile device. However, because the device does not have a composite view of the usage on any of the links, these limited observations cannot create link statistics without making many observations (which takes time and consumes radio resources). Since most types of packet data communications are bursty, it is difficult to make a brief observation and understand the average performance of the link or its trend. Therefore, service providers will often have to pay for Wi-Fi offload to a carrier due to the fact that the mobile device does not have a sufficient view of the network (cellular or service provider owned Wi-Fi) to make better decisions.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising: a processor; and a memory that stores executable instructions that, when executed by the processor, facilitate performance of operations, comprising: in response to a predicted radio load of a channel of a base station device associated with a service provider being determined to be less than a first threshold, receiving current radio load data from a Wi-Fi device that is not associated with the service provider, wherein the current radio load data is indicative of a first current radio load of the Wi-Fi device; and in response to the first current radio load being determined to be less than a second threshold, and based on a user equipment being determined to be currently stationary for at least a defined time period, transferring a communication of the user equipment from the base station device to the Wi-Fi device, wherein the first current radio load of the Wi-Fi device has been previously determined to be greater than a second current radio load of the Wi-Fi device.

2. The system of claim 1, wherein the operations further comprise:
    sending radio load request data, indicative of a radio load request, to the Wi-Fi device.

3. The system of claim 1, wherein the operations further comprise:
    determining a quality of service associated with the Wi-Fi device.

4. The system of claim 1, wherein the transferring is further based on a quality of service associated with the Wi-Fi device.

5. The system of claim 1, wherein the channel is a first channel, and wherein the operations further comprise: in further response to the first current radio load being determined to be less than the second threshold, switching to a second channel associated with the Wi-Fi device.

6. The system of claim 1, wherein the operations further comprise: in further response to the first current radio load being determined to be less than the second threshold, utilizing the channel to continue communication with the base station device.

7. The system of claim 1, wherein the predicted radio load is predicted as a function of time based on a standard deviation associated with radio load data comprising previous radio loads.

8. A non-transitory machine-readable medium, comprising executable instructions that, when executed by a processor, facilitate performance of operations, comprising:
    in response to a first value associated with first radio load data representative of a first radio load of a first channel of a base station device being determined to be less than a first threshold value, receiving second radio load data, via a server, associated with a first Wi-Fi device, wherein the second radio load data is indicative of a present first radio load, received via the server, associated with the first Wi-Fi device, and wherein the first Wi-Fi device is associated with a service provider identity; and
    in response to a condition associated with the present first radio load being determined to have been satisfied, facilitating a transmission of a communication of a user equipment from the first Wi-Fi device to a second Wi-Fi device via a second channel associated with the second Wi-Fi device, wherein the user equipment is determined to be in a stationary mode, wherein the condition is associated with a reduction in utilization of the first Wi-Fi device from a first utilization to a second utilization less than the first utilization, wherein the second Wi-Fi device is not associated with the service provider identity, and wherein a present second radio load of the second Wi-Fi device is determined to be greater than the present first radio load of the first Wi-Fi device prior to facilitating the transmission.

9. The non-transitory machine-readable medium of claim 8, wherein the first radio load data is associated with a duration of a quality of the first channel.

10. The non-transitory machine-readable medium of claim 8, wherein the operations further comprise:
    analyzing the second radio load data, associated with the first Wi-Fi device, to determine a quality of service.

11. The non-transitory machine-readable medium of claim 8, wherein the first radio load data comprises radio performance data representative of a radio performance of the first Wi-Fi device.

12. The non-transitory machine-readable medium of claim 8, wherein facilitating the transmission comprises analyzing global positioning system data associated with a location of the user equipment at which the user equipment entered the stationary mode.

13. The non-transitory machine-readable medium of claim 8, wherein facilitating the transmission comprises analyzing a position reference signal associated with a location of the user equipment at which the user equipment entered the stationary mode.

14. A method, comprising:
    based on a first value associated with a predicted radio load of network equipment associated with a service provider identity being determined to be less than a first threshold, receiving, by a user equipment comprising a processor from a Wi-Fi device that is not associated with the service provider identity, current radio load data indicative of a current radio load of the Wi-Fi device;
    based on the user equipment being currently determined to be stationary according to a defined criterion, and in response to a second value associated with the current radio load being determined to be less than a second threshold, utilizing, by the user equipment, a channel of the Wi-Fi device for a communication; and
    facilitating, by the user equipment, a transmission of the communication from the network equipment to the Wi-Fi device, wherein the second value being less than the second threshold is associated with a reduction in a utilization of the Wi-Fi device, and wherein the current radio load of the Wi-Fi device is determined to be greater than the predicted radio load of the network equipment.

15. The method of claim 14, further comprising:
facilitating, by the user equipment, transmitting, to the Wi-Fi device, radio load request data indicative of a radio load request.

16. The method of claim 14, further comprising:
facilitating, by the user equipment, sending, to the network equipment, global positioning data associated with a location of the user equipment.

17. The method of claim 14, wherein the predicted radio load data comprises time data representative of a time associated with a quality of service of the first channel.

18. The method of claim 14, wherein the predicted radio load data comprises duration data representative of a duration associated with a quality of service of the first channel.

19. The method of claim 14, wherein the communication is a first communication, and further comprising: in response to the utilizing the channel, terminating, by the user equipment, a second communication with the network equipment.

20. The method of claim 14, further comprising:
facilitating, by the user equipment, transmitting, to the network equipment, a positioning reference signal, associated with a location of the user equipment.

* * * * *